United States Patent
Li et al.

(10) Patent No.: US 10,911,896 B2
(45) Date of Patent: Feb. 2, 2021

(54) RRU POSITIONING METHOD AND RELATED APPARATUS THEREOF

(71) Applicant: Huawei Technologies Co., Ltd., Shenzhen (CN)

(72) Inventors: Xiaojie Li, Shenzhen (CN); Fei Jiao, Xi'an (CN); Jiehua Chen, Shanghai (CN); Xiaofeng Hu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/869,924

(22) Filed: May 8, 2020

(65) Prior Publication Data
US 2020/0267501 A1 Aug. 20, 2020

Related U.S. Application Data (63) Continuation of application No. PCT/CN2018/111160, filed on Oct. 22, 2018.

(30) Foreign Application Priority Data

Nov. 10, 2017 (CN) .......................... 2017 1 1112984

(51) Int. Cl.
*H04W 24/00* (2009.01)
*H04W 4/02* (2018.01)
*G01S 11/08* (2006.01)

(52) U.S. Cl.
CPC ............. *H04W 4/025* (2013.01); *G01S 11/08* (2013.01)

(58) Field of Classification Search
CPC ........ H04W 4/025; H04W 64/00; G01S 11/08
USPC ....................................................... 455/456.1
See application file for complete search history.

(56) References Cited

U.S. PATENT DOCUMENTS

| 5,293,645 | A | * | 3/1994 | Sood | ........................ | G01S 5/021 |
| | | | | | | 455/456.2 |
| 6,256,498 | B1 | * | 7/2001 | Ludwig | ..................... | H04B 7/26 |
| | | | | | | 455/433 |
| 6,518,921 | B1 | * | 2/2003 | Irvin | ........................ | G01S 1/045 |
| | | | | | | 342/387 |

(Continued)

FOREIGN PATENT DOCUMENTS

| CN | 101808359 A | 8/2010 |
| CN | 102045838 A | 5/2011 |

(Continued)

OTHER PUBLICATIONS

"Consolidated TP for TR37.857 Indoor Positioning Enhancements," Agenda Item: 6.2.6, Source: NextNav, Document for: Approval, 3GPP TSG RAN WG1 Meeting #81, R1-153647, Fukuoka, Japan, May 25-29, 2015, 31 pages.

(Continued)

*Primary Examiner* — Amancio Gonzalez
(74) *Attorney, Agent, or Firm* — Slater Matsil, LLP (57) ABSTRACT

A method includes: receiving, by a first RRU, a first reference signal sent by a second RRU, where the first RRU is a to-be-positioned RRU, and the second RRU is an RRU at a known location; determining, by the first RRU, a first delay value based on the first reference signal; and reporting, by the first RRU, the first delay value to an upper-layer network element, so that the upper-layer network element performs location resolving processing based on the first delay value, to obtain location.

15 Claims, 8 Drawing Sheets

(56) References Cited

U.S. PATENT DOCUMENTS

| | | | | |
|---|---|---|---|---|
| 7,994,982 | B2* | 8/2011 | Rakijas | G01S 11/02 |
| | | | | 342/458 |
| 8,270,359 | B2* | 9/2012 | Nangia | H04L 1/1896 |
| | | | | 370/329 |
| 10,677,884 | B2* | 6/2020 | Jiang | H04W 52/0212 |
| 2012/0190393 | A1* | 7/2012 | Ishii | H04W 64/00 |
| | | | | 455/509 |
| 2016/0134402 | A1* | 5/2016 | Park | H04L 27/2663 |
| | | | | 370/329 |
| 2019/0116568 | A1* | 4/2019 | Fertonani | H04W 56/00 |

FOREIGN PATENT DOCUMENTS

| | | |
|---|---|---|
| CN | 105516930 A | 4/2016 |
| CN | 106851550 A | 6/2017 |
| CN | 107105498 A | 8/2017 |
| EP | 3169087 A1 | 5/2017 |
| WO | 2016095718 A1 | 6/2016 |

OTHER PUBLICATIONS

"RAT Dependent NR Positioning Solutions," Agenda Item: 7.2.10.3, Source: Ericsson, Document for: Discussion, Decision, 3GPP TSG-RAN WG1 #94b, R1-1811530, Oct. 8-12, 2018, 13 pages.

* cited by examiner

RRU POSITIONING METHOD AND RELATED APPARATUS THEREOF

CROSS-REFERENCE TO RELATED APPLICATIONS

This application is a continuation of International Application No. PCT/CN2018/111160, filed on Oct. 22, 2018, which claims priority to Chinese Patent Application No. 201711112984.2, filed on Nov. 10, 2017. The disclosures of the aforementioned applications are hereby incorporated by reference in their entireties.

TECHNICAL FIELD

This application relates to the communications field, and in particular, to an RRU positioning method and an apparatus thereof.

BACKGROUND

In a wireless communications network, longitude and latitude information of deployed sites needs to be recorded. For a conventional macro base station, a remote radio unit (remote radio unit, RRU) and a baseband control unit (baseband control unit, BBU) are usually deployed at very close locations, and a global positioning system (global positioning system, GPS) apparatus is deployed on the BBU to record longitude and latitude information, and the information is automatically uploaded to a network management system.

In order to obtain location information of an RRU, a GPS module is also built in the RRU in the current system. However, because a GPS signal is weak, and transmit power of the RRU is high, interference is caused to obtaining of the location information, and GPS receiving sensitivity is affected. Therefore, an external antenna is further added in the RRU in the current system. As a result, costs of RRU positioning are high.

SUMMARY

Embodiments of this application provide an RRU positioning method and a related apparatus thereof, to position an RRU by using an existing network element device without adding external and internal positioning devices of the RRU, thereby reducing RRU positioning costs.

A first aspect of the embodiments of this application provides an RRU positioning method. The method specifically includes: receiving, by a first RRU, a first reference signal sent by a second RRU, where the first RRU is a to-be-positioned RRU, and the second RRU is an RRU at a known location; then determining, by the first RRU, a first delay value based on the first reference signal; and finally reporting, by the first RRU, the first delay value to an upper-layer network element, so that the upper-layer network element performs location resolving processing based on the first delay value, to obtain location information of the first RRU. This embodiment of this application can position an RRU by using an existing network element device without adding external and internal positioning devices of the RRU, thereby reducing RRU positioning costs.

In a possible design, in a first implementation of the first aspect of the embodiments of this application, before the receiving, by a first RRU, a reference signal sent by a second RRU, the method further includes: sending, by the first RRU, a second reference signal to the second RRU in a guard period GP, so that the second RRU calculates a second delay value based on the second reference signal, and adds the second delay value to the first reference signal. In this embodiment, in addition to receiving a reference signal sent by the second RRU, the first RRU further sends a reference signal to the second RRU, so that a subsequently calculated delay is more accurate.

In a possible design, in a second implementation of the first aspect of the embodiments of this application, the determining, by the first RRU, a first delay value based on the first reference signal includes: calculating, by the first RRU, a third delay value based on the first reference signal; and then calculating the first delay value based on the second delay value and the third delay value. In this embodiment, an actual delay value is calculated with reference to the third delay value and the second delay value, so that calculation is more accurate.

In a possible design, in a third implementation of the first aspect of the embodiments of this application, the calculating, by the first RRU, the first delay value based on the second delay value and the third delay value includes: calculating the first delay value in the following manner: A=(B+C)/2, where A is the first delay value; B is the second delay value; and C is the third delay value. This embodiment provides a specific manner of calculating the first delay value, and calculation is simple and easy to implement.

In a possible design, in a fourth implementation of the first aspect of the embodiments of this application, after the receiving, by a first RRU, a first reference signal sent by a second RRU, the method further includes: calculating, by the first RRU, an angle of direction based on the first reference signal; and reporting, by the first RRU, the angle of direction to the upper-layer network element, so that the upper-layer network element performs location resolving processing based on the first delay value and the angle of direction, to obtain the location information of the first RRU. In this embodiment of this application, the position information of the first RRU is further calculated with reference to the angle of direction, so that calculation is more accurate.

In a possible design, in a fifth implementation of the first aspect of the embodiments of this application, before the receiving, by a first RRU, a first reference signal sent by a second RRU, the method further includes: receiving, by the first RRU, a frame offset instruction after starting positioning, where the frame offset instruction then instructs an uplink window of the first RRU to correspond to a downlink window of the second RRU. In this embodiment of this application, frame offset is performed on the second RRU, thereby enriching specific implementations.

In a possible design, in a sixth implementation of the first aspect of the embodiments of this application, the first reference signal includes: a feature sequence signal, a primary synchronization signal PSS, a secondary synchronization signal SSS, a cell-specific reference signal CRS, and/or a positioning pilot signal. A type of the first reference signal is described in this embodiment of this application, thereby improving implementability of this embodiment.

A second aspect of the embodiments of this application provides an RRU positioning method. The method specifically includes: receiving, by a second RRU, a second reference signal sent by a first RRU, where the first RRU is a to-be-positioned RRU, and the second RRU is an RRU at a known location; then calculating, by the second RRU, sequence detection strength and a second delay value based on the second reference signal; and finally selecting, by the second RRU, a cell in which the detection strength is greater than a threshold to send a first reference signal to the first RRU, where the first reference signal carries the second delay value, so that the first RRU determines a first delay value based on the first reference signal, and reports the first delay value to an upper-layer network element, and the upper-layer network element performs location resolving processing based on the first delay value, to obtain location information of the first RRU. This embodiment of this application can position an RRU by using an existing network element device without adding external and internal positioning devices of the RRU, thereby reducing RRU positioning costs.

In a possible design, in a first implementation of the second aspect of the embodiments of this application, after the receiving, by a second RRU, a second reference signal sent by a first RRU, the method further includes: calculating, by the second RRU, an angle of direction based on the second reference signal. In this embodiment, the second RRU may further calculate the angle of direction, thereby improving integrity of this embodiment.

In a possible design, in a second implementation of the second aspect of the embodiments of this application, before the receiving, by a second RRU, a second reference signal sent by a first RRU, the method further includes: receiving, by the second RRU, a detection instruction, where the detection instruction is sent by the first RRU or the upper-layer network element, and the detection instruction is used to instruct the second RRU to prepare for signal detection. In this application, the second RRU prepares to perform sequence detection only after receiving the detection instruction, thereby saving resources.

A third aspect of the embodiments of this application provides an RRU positioning method. The method specifically includes: receiving, by an upper-layer network element, a first delay value sent by a first RRU, where the first RRU is a to-be-positioned RRU; and performing, by the upper-layer network element, location resolving processing based on the first delay value, to obtain location information of the first RRU. This embodiment of this application can position an RRU by using an existing network element device without adding external and internal positioning devices of the RRU, thereby reducing RRU positioning costs.

In a possible design, in a first implementation of the third aspect of the embodiments of this application, before the performing, by the upper-layer network element, location resolving processing based on the first delay value, the method further includes: receiving, by the upper-layer network element, an angle of direction sent by the first RRU. In this embodiment, the upper-layer network element further receives the angle of direction, so that subsequent calculation is more accurate.

In a possible design, in a second implementation of the third aspect of the embodiments of this application, the performing, by the upper-layer network element, location resolving processing based on the first delay value includes: performing, by the upper-layer network element, location resolving processing based on the first delay value and the angle of direction. In this embodiment, location resolving processing is performed by using the delay value and the angle of direction, so that calculation is more accurate.

In a possible design, in a third implementation of the third aspect of the embodiments of this application, before the receiving, by an upper-layer network element, a first delay value sent by a first RRU, the method further includes: sending, by the upper-layer network element, a frame offset instruction to the first RRU, where the frame offset instruction instructs an uplink window of the first RRU to correspond to a downlink window of a second RRU, and the second RRU is an RRU at a known location. In this embodiment, integrity of this embodiment is improved.

A fourth aspect of the embodiments of this application provides a first RRU. The first RRU specifically includes: a first receiving unit, configured to receive a first reference signal sent by a second RRU, where the first RRU is a to-be-positioned RRU, and the second RRU is an RRU at a known location; a determining unit, configured to determine a first delay value based on the first reference signal; and a first reporting unit, configured to report the first delay value to an upper-layer network element, so that the upper-layer network element performs location resolving processing based on the first delay value, to obtain location information of the first RRU.

This embodiment of this application can position an RRU by using an existing network element device without adding external and internal positioning devices of the RRU, thereby reducing RRU positioning costs.

In a possible design, in a first implementation of the fourth aspect of the embodiments of this application, the first RRU further includes: a sending unit, configured to send a second reference signal to the second RRU in a guard period GP, so that the second RRU calculates a second delay value based on the second reference signal, and adds the second delay value to the first reference signal. In this embodiment, in addition to receiving a reference signal sent by the second RRU, the first RRU further sends a reference signal to the second RRU, so that a subsequently calculated delay is more accurate.

In a possible design, in a second implementation of the fourth aspect of the embodiments of this application, the determining unit includes: a first calculation subunit, configured to calculate a third delay value based on the first reference signal; and a second determining subunit, configured to calculate the first delay value based on the second delay value and the third delay value.

In this embodiment, an actual delay value is calculated with reference to the third delay value and the second delay value, so that calculation is more accurate.

In a possible design, in a third implementation of the fourth aspect of the embodiments of this application, the second determining subunit includes: a calculation submodule, configured to calculate the first delay value in the following manner:

A=(B+C)/2, where

A is the first delay value;

B is the second delay value; and

C is the third delay value.

This embodiment provides a specific manner of calculating the first delay value, and calculation is simple and easy to implement.

In a possible design, in a fourth implementation of the fourth aspect of the embodiments of this application, the first RRU further includes: a calculation unit, configured to calculate an angle of direction based on the first reference signal; and a second reporting unit, configured to report the angle of direction to the upper-layer network element, so that the upper-layer network element performs location resolving processing based on the first delay value and the angle of direction, to obtain the location information of the first RRU.

In this embodiment of this application, the position information of the first RRU is further calculated with reference to the angle of direction, so that calculation is more accurate.

In a possible design, in a fifth implementation of the fourth aspect of the embodiments of this application, the first RRU further includes: a second receiving unit, configured to receive a frame offset instruction, where the frame offset instruction instructs an uplink window of the first RRU to correspond to a downlink window of the second RRU.

In this embodiment of this application, frame offset is performed on the second RRU, thereby enriching specific implementations.

In a possible design, in a sixth implementation of the fourth aspect of the embodiments of this application, the first reference signal includes: a feature sequence signal, a primary synchronization signal PSS, a secondary synchronization signal SSS, a cell-specific reference signal CRS, and/or a positioning pilot signal. A type of the first reference signal is described in this embodiment of this application, thereby improving implementability of this embodiment.

A fifth aspect of the embodiments of this application provides a second RRU. The second RRU specifically includes: a first receiving unit, configured to receive a second reference signal sent by a first RRU, where the first RRU is a to-be-positioned RRU, and the second RRU is an RRU at a known location; a first calculation unit, configured to calculate a sequence detection strength and a second delay value based on the second reference signal; and a sending unit, configured to select a cell in which the detection strength is greater than a threshold to send a first reference signal to the first RRU, where the first reference signal carries the second delay value, so that the first RRU determines a first delay value based on the first reference signal, and reports the first delay value to an upper-layer network element, and the upper-layer network element performs location resolving processing based on the first delay value, to obtain location information of the first RRU.

This embodiment of this application can position an RRU by using an existing network element device without adding external and internal positioning devices of the RRU, thereby reducing RRU positioning costs.

In a possible design, in a first implementation of the fifth aspect of the embodiments of this application, the second RRU further includes: a second calculation unit, configured to calculate an angle of direction based on the second reference signal.

In this embodiment, the second RRU may further calculate the angle of direction, thereby improving integrity of this embodiment.

In a possible design, in a second implementation of the fifth aspect of the embodiments of this application, the second RRU further includes: a second receiving unit, configured to receive a detection instruction, where the detection instruction is sent by the first RRU or the upper-layer network element, and the detection instruction is used to instruct the second RRU to prepare for signal detection.

In this application, the second RRU prepares to perform sequence detection only after receiving the detection instruction, thereby saving resources.

A sixth aspect of the embodiments of this application provides an upper-layer network element. The upper-layer network element specifically includes: a first receiving unit, configured to receive a first delay value sent by a first RRU, where the first RRU is a to-be-positioned RRU; and a processing unit, configured to perform location resolving processing based on the first delay value, to obtain location information of the first RRU.

This embodiment of this application can position an RRU by using an existing network element device without adding external and internal positioning devices of the RRU, thereby reducing RRU positioning costs.

In a possible design, in a first implementation of the sixth aspect of the embodiments of this application, the upper-layer network element further includes: a second receiving unit, configured to receive an angle of direction sent by the first RRU.

In this embodiment, the upper-layer network element further receives the angle of direction, so that subsequent calculation is more accurate.

In a possible design, in a second implementation of the sixth aspect of the embodiments of this application, the processing unit includes: a processing subunit, configured to perform location resolving processing based on the first delay value and the angle of direction.

In this embodiment, location resolving processing is performed by using the delay value and the angle of direction, so that calculation is more accurate.

In a possible design, in a third implementation of the sixth aspect of the embodiments of this application, the upper-layer network element further includes: a sending unit, configured to send a frame offset instruction to the first RRU, where the frame offset instruction instructs an uplink window of the first RRU to correspond to a downlink window of a second RRU, and the second RRU is an RRU at a known location.

In this embodiment, integrity of this embodiment is improved.

Another aspect of this application provides a computer-readable storage medium. The computer-readable storage medium stores an instruction. When the instruction is run on a computer, the computer is enabled to perform the methods according to the foregoing aspects.

Another aspect of this application provides a computer program product including an instruction, and when the computer program product is run on a computer, the computer is enabled to perform the methods according to the foregoing aspects.

According to the foregoing technical solutions, the embodiments of this application have the following advantages.

In the embodiments of this application, the first RRU receives the first reference signal sent by the second RRU, where the first RRU is a to-be-positioned RRU, and the second RRU is an RRU at a known location; the first RRU determines the first delay value based on the first reference signal; and the first RRU reports the first delay value to the upper-layer network element, so that the upper-layer network element performs location resolving processing based on the first delay value, to obtain the location information of the first RRU. The embodiments of this application can position an RRU by using an existing network element device without adding external and internal positioning devices of the RRU, thereby reducing RRU positioning costs.

DETAILED DESCRIPTION OF ILLUSTRATIVE EMBODIMENTS

Embodiments of this application provide an RRU positioning method and a related apparatus thereof, to position an RRU by using an existing network element device without adding external and internal positioning devices of the RRU, thereby reducing RRU positioning costs.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a series of steps or units is not necessarily limited to those units, but may include other units not expressly listed or inherent to such a process, method, system, product, or device.

Figure 1:
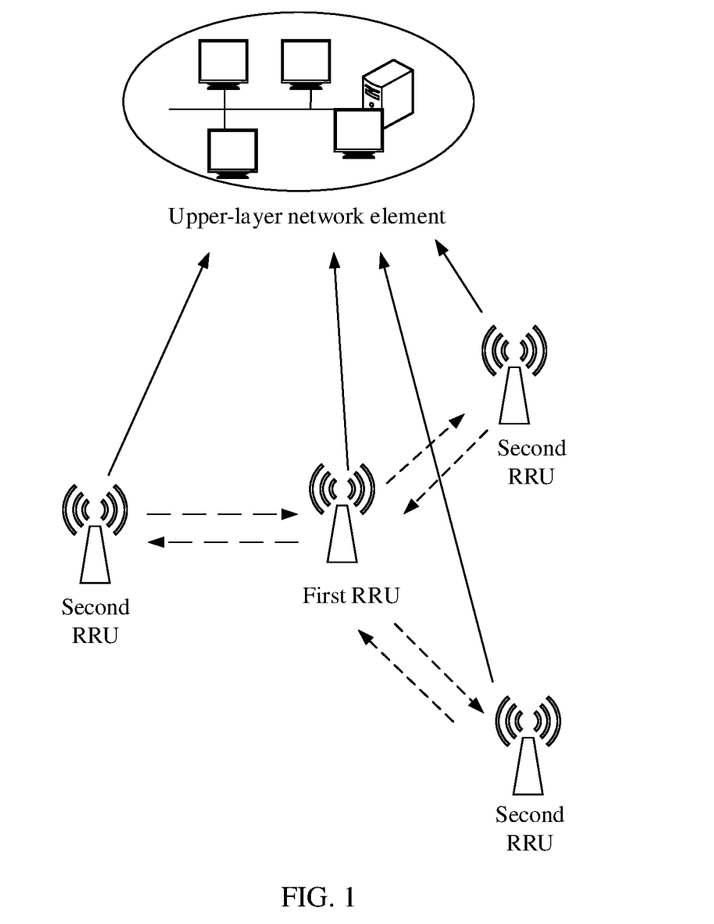
FIG. 1 is a schematic diagram of a system architecture of an RRU positioning method according to an embodiment of this application.

The embodiments of the present invention may be applied to the system architecture shown in FIG. 1. In the system architecture, a first RRU and a second RRU send sequences to each other, and an evolved NodeB (evolved Node B, eNB) in which the first RRU and the second RRU are located calculates a delay, and reports the calculated delay to an upper-layer network element to calculate a location of the first RRU. The first RRU is a to-be-positioned RRU, the second RRU is an RRU that assists in positioning the first RRU, and the second RRU is an RRU at a known location. The RRU in the system is an RRU in a time division duplex (time division duplex, TDD) standard.

Figure 2:
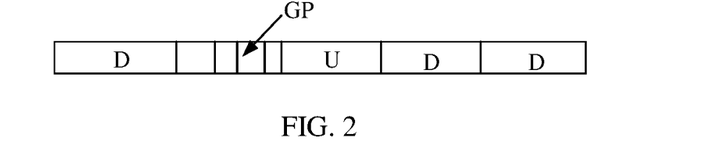
FIG. 2 is a schematic diagram of a frame structure of an RRU positioning method according to an embodiment of this application.

FIG. 2 shows a frame structure of a TDD long term evolution (long term evolution, LTE) configuration 2. For an eNB, a U subframe is used only for receiving uplink data, a D subframe is used only for transmitting downlink data, and usually, in a guard period (Guard Period, GP), data is not sent or received, but data may still be sent and received for a feature function. In the embodiments of this application, based on features of a TDD frame structure, an RRU may be simulated as user equipment (user equipment, UE), to send or receive a sequence in the GP or by using an appropriate frame offset, detect an arrival delay and/or an angle of direction, and report a detection result to the upper-layer network element, to perform positioning calculation.

Figure 3:
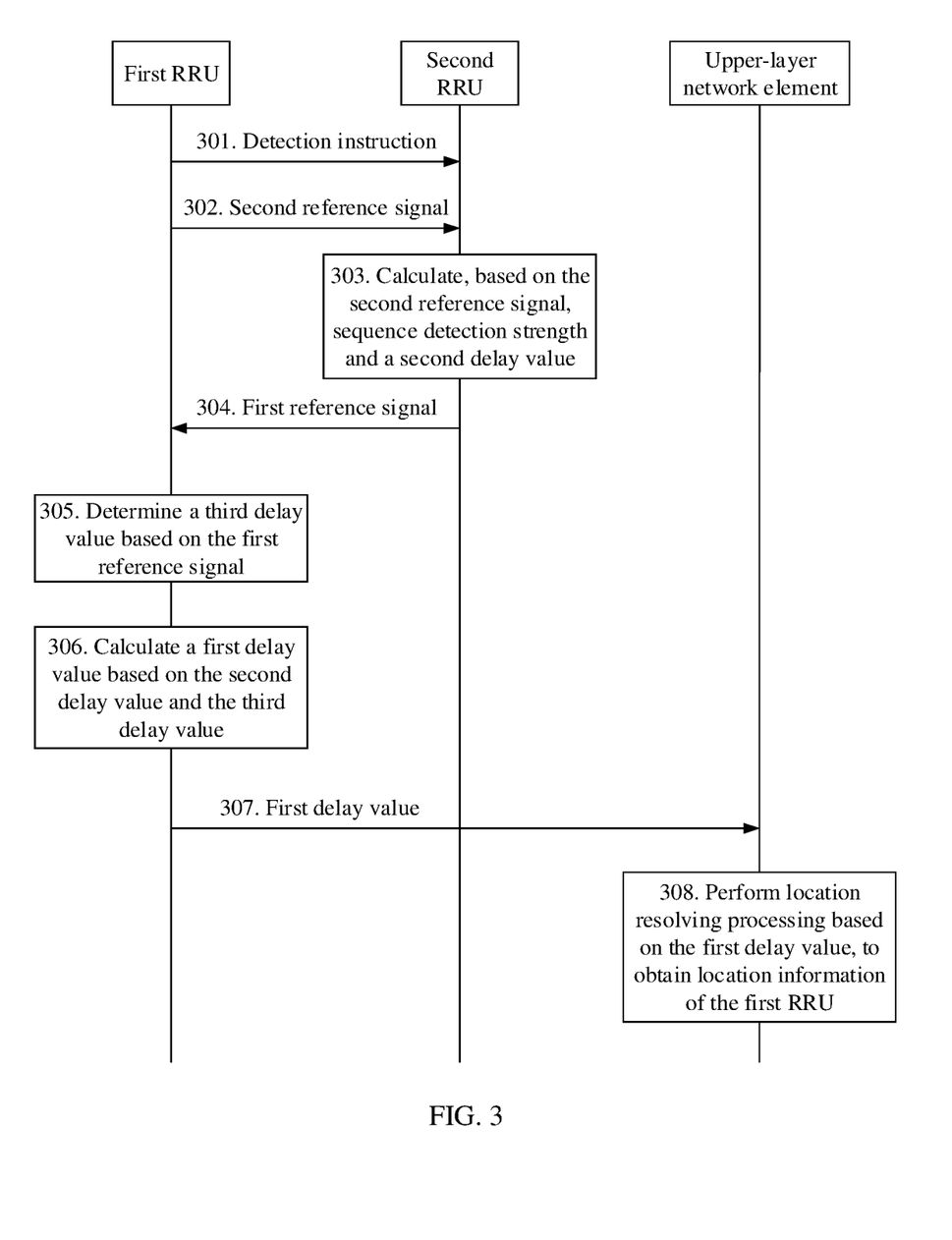
FIG. 3 is a schematic diagram of an embodiment of an RRU positioning method according to the embodiments of this application.

Referring to FIG. 3, an embodiment of an RRU positioning method according to the embodiments of the present invention includes the following steps.

301. A first RRU sends a detection instruction to a second RRU.

In this embodiment, the first RRU sends a detection instruction to the second RRU after starting positioning, and the detection instruction is used to instruct the second RRU to prepare for sequence detection. To be specific, an eNB in which the first RRU is located instructs a surrounding cell to prepare for sequence detection. The first RRU is a to-be-positioned RRU, and the second RRU is an RRU at a known location.

It should be noted that the detection instruction may alternatively be sent by an upper-layer network element to the second RRU. A specific sending method is not limited herein.

302. The first RRU sends a second reference signal to the second RRU in a GP.

In this embodiment, after the first RRU starts positioning and the second RRU prepares for sequence detection, the sending, by the first RRU, a second reference signal to the second RRU in a GP may be specifically sending, by the first RRU, a feature sequence signal to the surrounding cell in the GP.

It should be noted that the feature sequence signal may be designed as a sequence with relatively good autocorrelation, for example, a ZC sequence or a pseudo-random sequence, and the sequence is a sequence known to all cells.

303. The second RRU calculates sequence detection strength and a second delay value based on the second reference signal.

In this embodiment, the calculating, by the second RRU, the sequence detection strength and the second delay value based on the second reference signal received in the GP may be specifically: performing, by the surrounding cell of the first RRU, related operations by using a prestored known sequence and a received signal, to obtain the sequence detection strength, the second delay value, and an angle of direction. It should be noted that the second RRU may not calculate the angle of direction. This is not specifically limited herein.

A manner of calculating the second delay value may be: a sending sequence (a sequence pre-stored in the second RRU) is x(n), and n=0, 1, . . . , N; a received signal (a sequence received by the second RRU) is y(p), p=0, 1, . . . , P, and P>=N; and a detected signal is:

$$r(i) = \sum_{k=0}^{k=N} x(k)y(k+i), i = 0, 1, \ldots, P-N+1,$$

where an amplitude of r(i) is sequence detection strength, and a sampling time corresponding to the first sequence number i that is in the sequence detection strength and that is greater than a threshold is the second delay value.

It should be noted that the second RRU may alternatively calculate the angle of direction based on the second reference signal.

304. The second RRU selects a cell in which the detection strength is greater than a threshold to send a first reference signal to the first RRU.

In this embodiment, the second RRU selects the cell in which the detection strength is greater than the threshold to send the first reference signal to the first RRU in the GP, where the first reference signal carries the second delay value and/or the angle of direction. Specifically, a cell served by a surrounding base station that provides detection strength greater than a threshold sends a sequence.

305. The first RRU determines a third delay value based on the first reference signal.

In this embodiment, the first RRU performs sequence detection based on the first reference signal, to calculate the third delay value. In addition, the first RRU may further calculate the angle of direction based on the first reference signal. It should be noted that the first RRU may not calculate the angle of direction. This is not specifically limited herein.

306. The first RRU calculates a first delay value based on the second delay value and the third delay value.

In this embodiment, because a measured delay value is equal to actual delay value+error of sending frame header of RRU−error of receiving frame header of RRU, the second delay value is equal to actual delay value+frame header error of the first RRU−frame header error of the second RRU, and the third delay value is equal to actual delay value+frame header error of the second RRU−frame header error of the first RRU. The foregoing two formulas are subtracted, to obtain that the actual delay value is equal to (second delay value+third delay value)/2.

In this embodiment, a to-be-positioned RRU and a surrounding detecting RRU perform mutual transmission and reception, and receiving delays of one pair of RRUs that perform mutual operations of transmission and reception are averaged, to eliminate impact of a synchronization error between the RRUs and accurately estimate an actual delay between the RRUs.

It should be noted that, in this embodiment, the first delay value is the actual delay value.

307. The first RRU reports the first delay value to the upper-layer network element.

In this embodiment, the first RRU reports the calculated first delay value to the upper-layer network element, and the first RRU or the second RRU may further report the angle of direction to the upper-layer network element, so that the upper-layer network element performs location resolving based on the first delay value and/or the angle of direction. It should be noted that if the angle of direction is not reported to the upper-layer network element, at least three second RRUs (three first delay values) are needed to resolve location information of the first RRU. If the angle of direction is reported to the upper-layer network element, the location information of the first RRU may be calculated by using only one or two second RRUs.

308. The upper-layer network element performs location resolving processing based on the first delay value, to obtain the location information of the first RRU.

In this embodiment, the upper-layer network element performs location resolving processing based on the first delay value. If the first RRU or the second RRU reports the angle of direction to the upper-layer network element, the upper-layer network element further performs location resolving processing based on the first delay value and the angle of direction, to obtain the location information of the first RRU.

In this embodiment of this application, the first RRU receives, in the GP, the first reference signal sent by the second RRU in the GP, where the first RRU is a to-be-positioned RRU, and the second RRU is an RRU at a known location; then the first RRU determines the first delay value based on the first reference signal; and the first RRU reports the first delay value to the upper-layer network element, so that the upper-layer network element performs location resolving processing based on the first delay value, to obtain the location information of the first RRU. In this embodiment, a dedicated positioning sequence is designed to be sent and received in the GP, sequence receiving signal strength and a delay between RRUs are estimated, and delay-based positioning is performed. In this way, an RRU can be positioned by using an existing network element device without adding external and internal positioning devices of the RRU, thereby reducing RRU positioning costs.

Figure 4:
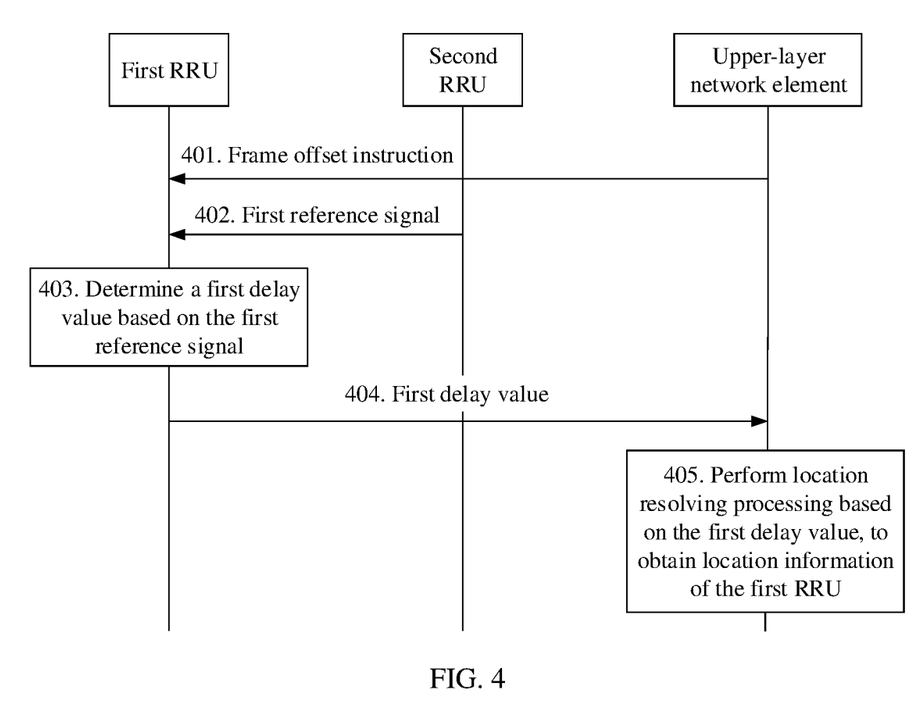
FIG. 4 is a schematic diagram of another embodiment of an RRU positioning method according to the embodiments of this application.

Referring to FIG. 4, another embodiment of an RRU positioning method according to the embodiments of the present invention includes the following steps.

401. An upper-layer network element sends a frame offset instruction to a first RRU.

In this embodiment, after positioning is started, the upper-layer network element sends the frame offset instruction to the first RRU, so that an uplink receive window of a cell of the first RRU falls in a downlink transmit window of a surrounding cell (a cell of the second RRU), where the first RRU is a to-be-positioned RRU, and the second RRU is an RRU at a known location.

402. The first RRU receives a first reference signal sent by the second RRU.

In this embodiment, the receiving, by the first RRU, a first reference signal sent by the second RRU may be specifically: searching for, by the first RRU, a first reference signal of a surrounding base station. The first reference signal includes a primary synchronization signal (primary synchronization signal, PSS), a secondary synchronization signal (secondary synchronization signal, SSS), a cell-specific reference signal (cell-specific reference signals, CRS), and/or a positioning pilot signal.

403. The first RRU determines a first delay value based on the first reference signal.

In this embodiment, after the first RRU receives the first reference signal, the cell of the first RRU calculates a delay value based on the first reference signal, to obtain a delay difference between the first RRU and the second RRU, that is, to obtain the first delay value.

404. The first RRU reports the first delay value to the upper-layer network element.

In this embodiment, after obtaining the first delay value through calculation, the cell of the first RRU reports the first delay value to the upper-layer network element, so that the upper-layer network element may perform location resolving based on the first delay value, to obtain location information of the first RRU.

405. The upper-layer network element performs location resolving processing based on the first delay value, to obtain the location information of the first RRU.

In this embodiment, after receiving the first delay value, the upper-layer network element performs location resolving processing based on the first delay value, to obtain the location information of the first RRU.

In this embodiment of this application, after positioning is started, the upper-layer network element sends the frame offset instruction to the first RRU, so that the uplink receive window of the first RRU cell falls in the downlink transmit window of the second RRU cell. Then, the first RRU searches for the first reference signal of the second RRU, and calculates the first delay value based on the first reference signal. In addition, the first delay value is reported to the upper-layer network element, and the upper-layer network element performs location resolving processing by using the first delay value, to obtain the location information of the first RRU. In this way, an RRU can be positioned by using an existing network element device without adding external and internal positioning devices of the RRU, thereby reducing RRU positioning costs.

Figure 5:
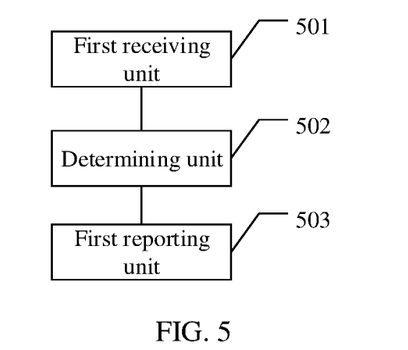
FIG. 5 is a schematic diagram of an embodiment of a first RRU according to the embodiments of this application.

Referring to FIG. 5, an embodiment of a first RRU in the embodiments of this application includes: a first receiving unit 501, configured to receive a first reference signal sent by a second RRU, where the first RRU is a to-be-positioned RRU, and the second RRU is an RRU at a known location; a determining unit 502, configured to determine a first delay value based on the first reference signal; and a first reporting unit 503, configured to report the first delay value to an upper-layer network element, so that the upper-layer network element performs location resolving processing based on the first delay value, to obtain location information of the first RRU.

In this embodiment of this application, the first receiving unit 501 receives the first reference signal sent by the second RRU, where the first RRU is a to-be-positioned RRU, and the second RRU is an RRU at a known location; the determining unit 502 determines the first delay value based on the first reference signal; and the first reporting unit 503 reports the first delay value to the upper-layer network element, so that the upper-layer network element performs location resolving processing based on the first delay value, to obtain the location information of the first RRU. This embodiment of this application can position an RRU by using an existing network element device without adding external and internal positioning devices of the RRU, thereby reducing RRU positioning costs.

Figure 6:
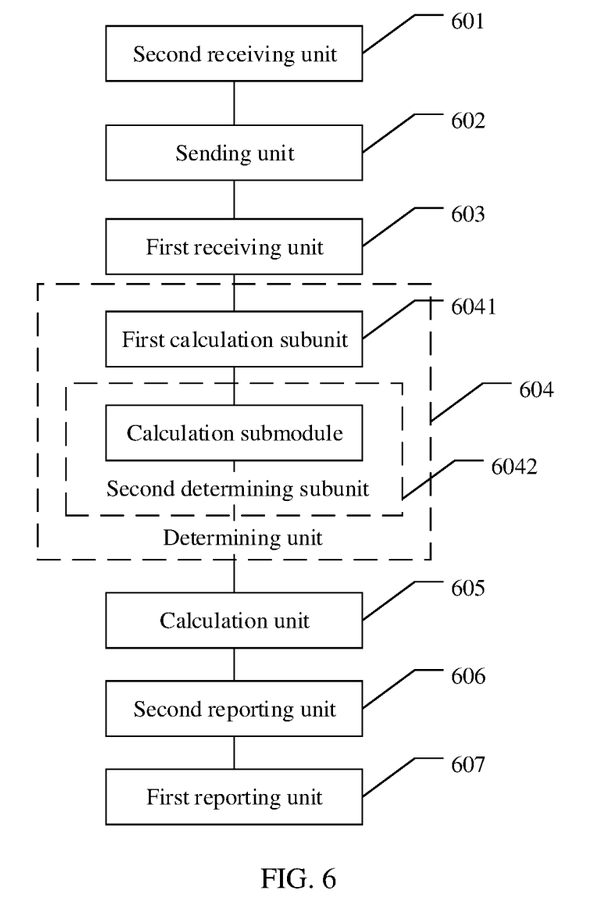
FIG. 6 is a schematic diagram of another embodiment of a first RRU according to the embodiments of this application.

Referring to FIG. 6, another embodiment of a first RRU in the embodiments of this application includes: a second receiving unit 601, configured to receive a frame offset instruction, where the frame offset instruction instructs an uplink window of the first RRU to correspond to a downlink window of a second RRU; a sending unit 602, configured to send a second reference signal to the second RRU in a guard period GP, so that the second RRU calculates a second delay value based on the second reference signal, and adds the second delay value to a first reference signal; a first receiving unit 603, configured to receive the first reference signal sent by the second RRU, where the first RRU is a to-be-positioned RRU, and the second RRU is an RRU at a known location; a determining unit 604, configured to determine a first delay value based on the first reference signal, where the determining unit 604 includes: a first calculation subunit 6041, configured to calculate a third delay value based on the first reference signal; and a second determining subunit 6042, configured to calculate the first delay value based on the second delay value and the third delay value, where the second determining subunit 6042 includes: a calculation submodule, configured to calculate the first delay value in the following manner: A=(B+C)/2, where A is the first delay value; B is the second delay value; and C is the third delay value; a calculation unit 605, configured to calculate an angle of direction based on the first reference signal; a second reporting unit 606, configured to report the angle of direction to an upper-layer network element, so that the upper-layer network element performs location resolving processing based on the first delay value and the angle of direction, to obtain location information of the first RRU; and a first reporting unit 607, configured to report the first delay value to the upper-layer network element, so that the upper-layer network element performs location resolving processing based on the first delay value, to obtain the location information of the first RRU.

In this embodiment of this application, the first receiving unit 603 receives the first reference signal sent by the second RRU, where the first RRU is a to-be-positioned RRU, and the second RRU is an RRU at a known location; the determining unit 604 determines the first delay value based on the first reference signal; and the first reporting unit 607 reports the first delay value to the upper-layer network element, so that the upper-layer network element performs location resolving processing based on the first delay value, to obtain the location information of the first RRU. This embodiment of this application can position an RRU by using an existing network element device without adding external and internal positioning devices of the RRU, thereby reducing RRU positioning costs.

Figure 7:
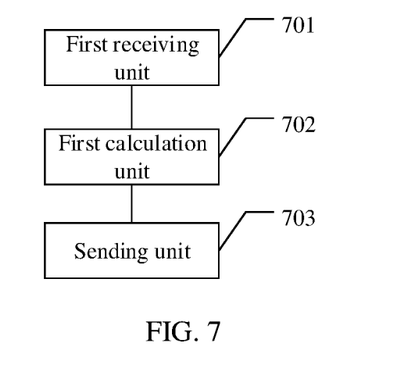
FIG. 7 is a schematic diagram of an embodiment of a second RRU according to the embodiments of this application.

Referring to FIG. 7, an embodiment of a second RRU in the embodiments of this application includes: a first receiving unit 701, configured to receive a second reference signal sent by a first RRU, where the first RRU is a to-be-positioned RRU, and the second RRU is an RRU at a known location; a first calculation unit 702, configured to calculate sequence detection strength and a second delay value based on the second reference signal; and a sending unit 703, configured to select a cell in which the detection strength is greater than a threshold to send a first reference signal to the first RRU, where the first reference signal carries the second delay value, so that the first RRU determines a first delay value based on the first reference signal, and reports the first delay value to an upper-layer network element, and the upper-layer network element performs location resolving processing based on the first delay value, to obtain location information of the first RRU.

In this embodiment of this application, the first receiving unit 701 receives the second reference signal sent by the first RRU, where the first RRU is a to-be-positioned RRU, and the second RRU is an RRU at a known location; the first calculation unit 702 calculates the sequence detection strength and the second delay value based on the second reference signal; and the sending unit 703 selects the cell in which the detection strength is greater than a threshold to send the first reference signal to the first RRU, and the first reference signal carries the second delay value, so that the first RRU determines the first delay value based on the first reference signal, and reports the first delay value to the upper-layer network element, and the upper-layer network element performs location resolving processing based on the first delay value, to obtain the location information of the first RRU. This embodiment of this application can position an RRU by using an existing network element device without adding external and internal positioning devices of the RRU, thereby reducing RRU positioning costs.

Figure 8:
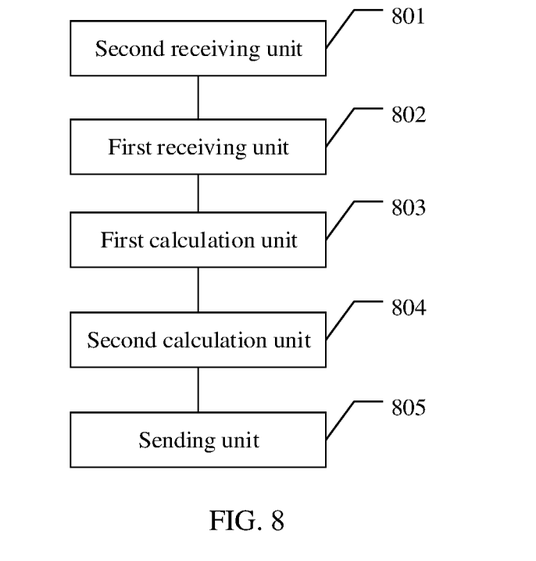
FIG. 8 is a schematic diagram of another embodiment of a second RRU according to the embodiments of this application.

Referring to FIG. 8, another embodiment of a second RRU in the embodiments of this application includes: a second receiving unit 801, configured to receive a detection instruction, where the detection instruction is sent by a first RRU or an upper-layer network element, and the detection instruction is used to instruct the second RRU to prepare for signal detection; a first receiving unit 802, configured to receive a second reference signal sent by the first RRU, where the first RRU is a to-be-positioned RRU, and the second RRU is an RRU at a known location a first calculation unit 803, configured to calculate sequence detection strength and a second delay value based on the second reference signal; a second calculation unit 804, configured to calculate an angle of direction based on the second reference signal; and a sending unit 805, configured to select a cell in which the detection strength is greater than a threshold to send a first reference signal to the first RRU, where the first reference signal carries the second delay value, so that the first RRU determines a first delay value based on the first reference signal, and reports the first delay value to an upper-layer network element, and the upper-layer network element performs location resolving processing based on the first delay value, to obtain location information of the first RRU.

In this embodiment of this application, the first receiving unit 802 receives the second reference signal sent by the first RRU, where the first RRU is a to-be-positioned RRU, and the second RRU is an RRU at a known location; the first calculation unit 803 calculates the sequence detection strength and the second delay value based on the second reference signal; and the sending unit 805 selects the cell in which the detection strength is greater than a threshold to send the first reference signal to the first RRU, and the first reference signal carries the second delay value, so that the first RRU determines the first delay value based on the first reference signal, and reports the first delay value to the upper-layer network element, and the upper-layer network element performs location resolving processing based on the first delay value, to obtain the location information of the first RRU. This embodiment of this application can position an RRU by using an existing network element device without adding external and internal positioning devices of the RRU, thereby reducing RRU positioning costs.

Figure 9:
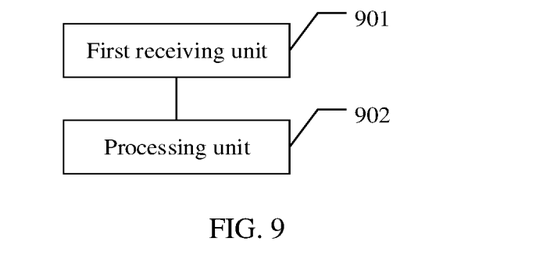
FIG. 9 is a schematic diagram of an embodiment of an upper-layer network element according to the embodiments of this application.

Referring to FIG. 9, an embodiment of an upper-layer network element in the embodiments of this application includes: a first receiving unit 901, configured to receive a first delay value sent by a first RRU, where the first RRU is a to-be-positioned RRU; and a processing unit 902, configured to perform location resolving processing based on the first delay value, to obtain location information of the first RRU.

In this embodiment of this application, the first receiving unit 901 receives the first delay value sent by the first RRU, and the first RRU is a to-be-positioned RRU; and the processing unit 902 performs location resolving processing based on the first delay value, to obtain the location information of the first RRU. This embodiment of this application can position an RRU by using an existing network element device without adding external and internal positioning devices of the RRU, thereby reducing RRU positioning costs.

Figure 10:
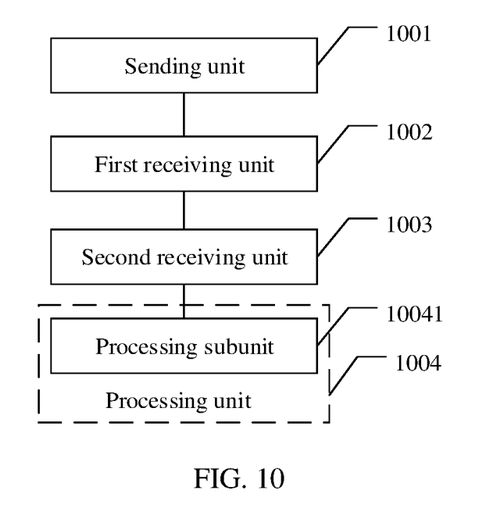
FIG. 10 is a schematic diagram of another embodiment of an upper-layer network element according to the embodiments of this application.

Referring to FIG. 10, another embodiment of an upper-layer network element in the embodiments of this application includes: a sending unit 1001, configured to send a frame offset instruction to a first RRU, where the frame offset instruction instructs an uplink window of the first RRU to correspond to a downlink window of a second RRU, and the second RRU is an RRU at a known location; a first receiving unit 1002, configured to receive a first delay value sent by the first RRU, where the first RRU is a to-be-positioned RRU; a second receiving unit 1003, configured to receive an angle of direction sent by the first RRU; and a processing unit 1004, configured to perform location resolving processing based on the first delay value, to obtain location information of the first RRU.

The processing unit 1004 includes: a processing subunit 10041, configured to perform location resolving processing based on the first delay value and the angle of direction.

In this embodiment of this application, the first receiving unit 1002 receives the first delay value sent by the first RRU, and the first RRU is a to-be-positioned RRU; and the processing unit 1004 performs location resolving processing based on the first delay value, to obtain the location information of the first RRU. This embodiment of this application can position an RRU by using an existing network element device without adding external and internal positioning devices of the RRU, thereby reducing RRU positioning costs.

Figure 11:
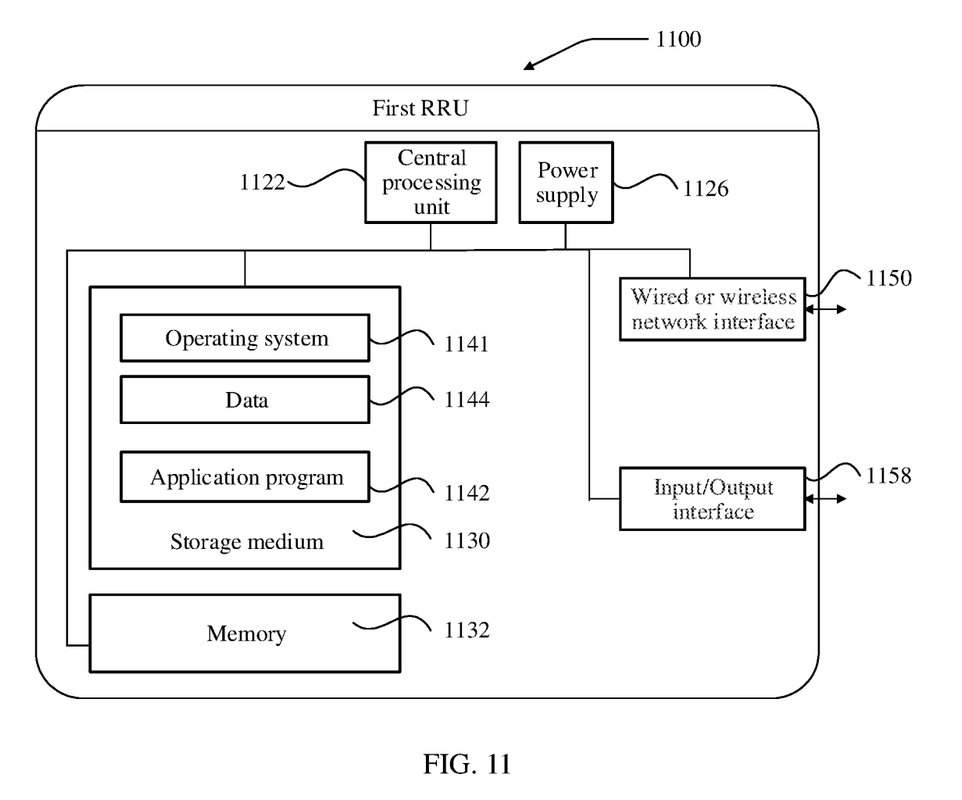
FIG. 11 is a schematic diagram of another embodiment of a first RRU according to the embodiments of this application.

Referring to FIG. 11, another embodiment of a first RRU in the embodiments of this application includes:

FIG. 11 is a schematic structural diagram of a first RRU according to an embodiment of the present invention. The first RRU 1100 may have a relatively large difference due to different configurations or performance, and may include one or more central processing units (central processing units, CPU) 1122 (for example, one or more processors), a memory 1132, one or more storage media 1130 (for example, one or more mass storage devices) that store an application program 1142 or data 1144. The memory 1132 and the storage medium 1130 may be transient storage or persistent storage. A program stored in the storage medium 1130 may include one or more modules (not shown), and each module may include a series of instruction operations for the first RRU. Further, the central processing unit 1122 may be configured to communicate with the storage medium 1130, and perform, on the first RRU 1100, the series of instruction operations in the storage medium 1130.

The first RRU 1100 may further include one or more power supplies 1126, one or more wired or wireless network interfaces 1150, one or more input/output interfaces 1158, and/or one or more operating systems 1141 such as Windows Server™, Mac OS X™, Unix™, Linux™, and FreeBSD™.

The steps performed by the first RRU in the foregoing embodiments may be based on the structure of the first RRU shown in FIG. 11.

Figure 12:
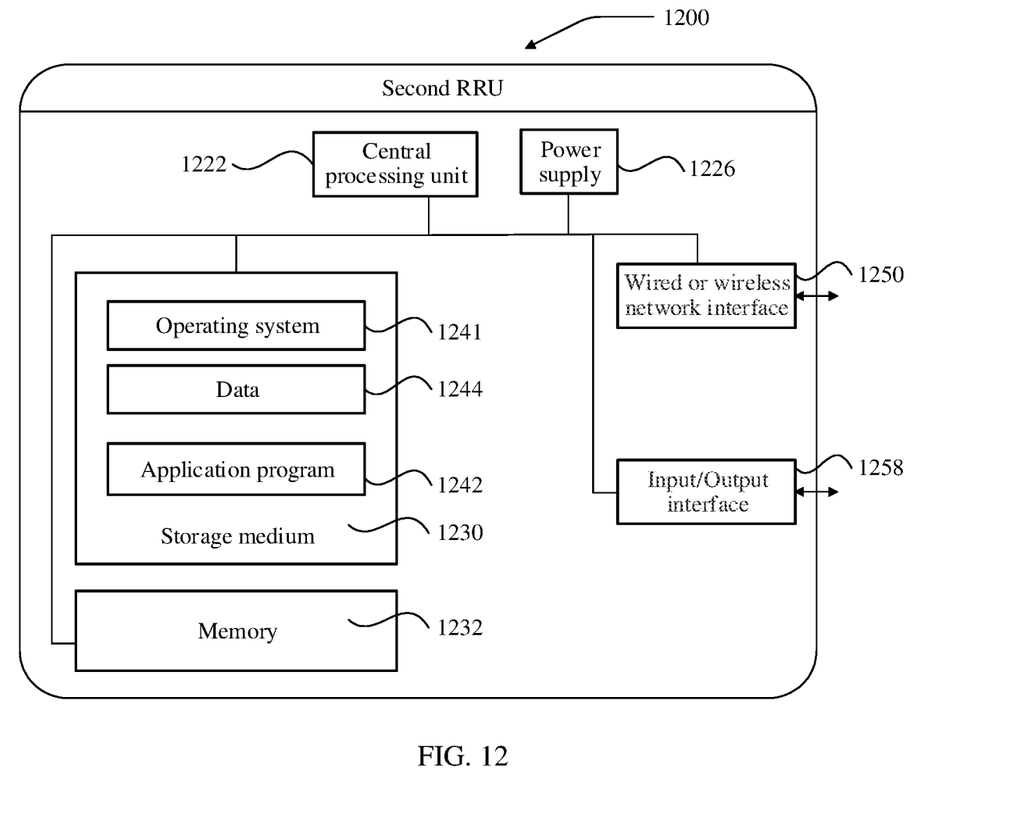
FIG. 12 is a schematic diagram of another embodiment of a second RRU according to the embodiments of this application.

Referring to FIG. 12, another embodiment of a second RRU in the embodiments of this application includes:

FIG. 12 is a schematic structural diagram of a second RRU according to an embodiment of the present invention. The second RRU 1200 may have a relatively large difference due to different configurations or performance, and may include one or more central processing units (central processing units, CPU) 1222 (for example, one or more processors), a memory 1232, one or more storage media 1230 (for example, one or more mass storage devices) that store an application program 1242 or data 1244. The memory 1232 and the storage medium 1230 may be transient storage or persistent storage. A program stored in the storage medium 1230 may include one or more modules (not shown), and each module may include a series of instruction operations for the second RRU. Further, the central processing unit 1222 may be configured to communicate with the storage medium 1230, and perform, on the second RRU 1200, the series of instruction operations in the storage medium 1230.

The second RRU 1200 may further include one or more power supplies 1226, one or more wired or wireless network interfaces 1250, one or more input/output interfaces 1258, and/or one or more operating systems 1241 such as Windows Server™, Mac OS X™, Unix™, Linux™, and FreeBSD™.

The steps performed by the second RRU in the foregoing embodiments may be based on the structure of the second RRU shown in FIG. 12.

Figure 13:
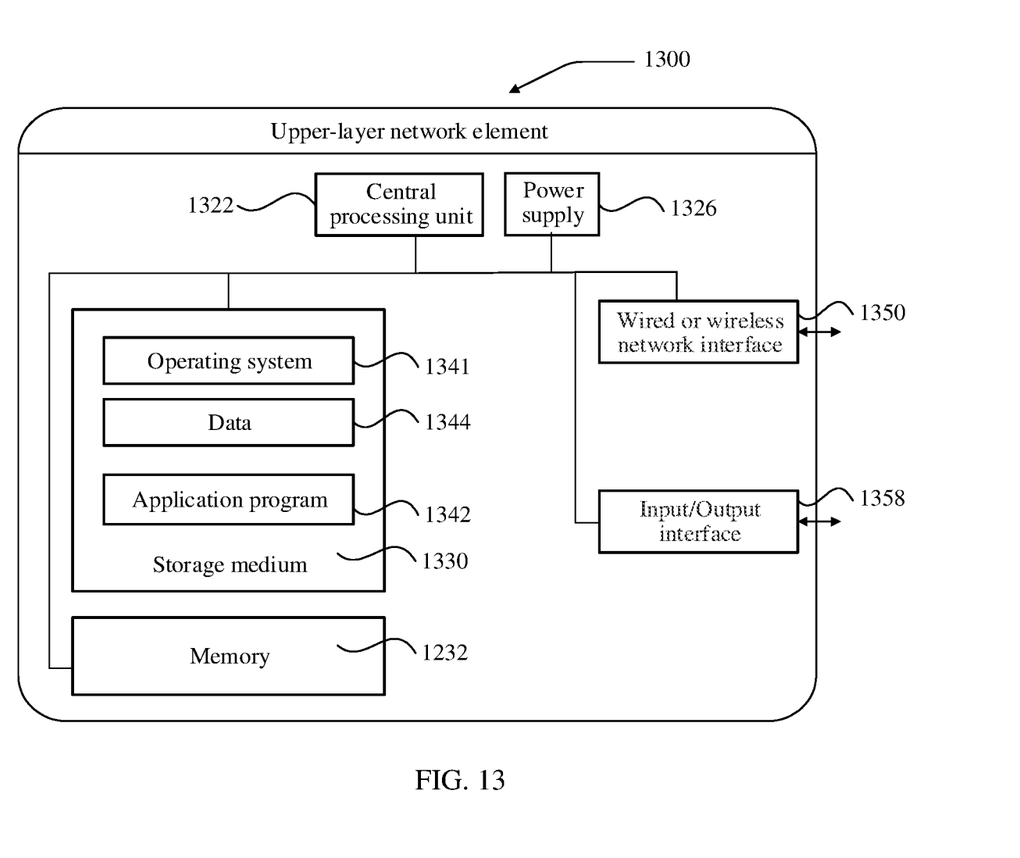
FIG. 13 is a schematic diagram of another embodiment of an upper-layer network element according to the embodiments of this application.

Referring to FIG. 13, another embodiment of an upper-layer network element in the embodiments of this application includes:

FIG. 13 is a schematic structural diagram of an upper-layer network element according to an embodiment of the present invention. The upper-layer network element 1300 may have a relatively large difference due to different configurations or performance, and may include one or more central processing units (central processing units, CPU) 1322 (for example, one or more processors), a memory 1332, one or more storage media 1330 (for example, one or more mass storage devices) that store an application program 1342 or data 1344. The memory 1332 and the storage medium 1330 may be transient storage or persistent storage. A program stored in the storage medium 1330 may include one or more modules (not shown), and each module may include a series of instruction operations for the upper-layer network element. Further, the central processing unit 1322 may be configured to communicate with the storage medium 1330, and perform, on the upper-layer network element 1300, the series of instruction operations in the storage medium 1330.

The upper-layer network element 1300 may further include one or more power supplies 1326, one or more wired or wireless network interfaces 1350, one or more input/output interfaces 1358, and/or one or more operating systems 1341 such as Windows Server™, Mac OS X™, Unix™, Linux™, and FreeBSD™.

The steps performed by the upper-layer network element in the foregoing embodiments may be based on the structure of the upper-layer network element shown in FIG. 13.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the current system, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method, comprising:
    receiving, by a first remote radio unit (RRU), a first reference signal from a second RRU, wherein the first RRU is a to-be-positioned RRU, and the second RRU is located at a known location;
    determining, by the first RRU, a first delay value according to the first reference signal; and reporting, by the first RRU, the first delay value to an upper-layer network element, location resolving processing and obtaining location information of the first RRU are performed according to the first delay value.

2. The method according to claim 1, wherein before receiving, by the first RRU, the first reference signal from the second RRU, the method further comprises:
sending, by the first RRU, a second reference signal to the second RRU in a guard period (GP), so that the second RRU calculates a second delay value according to the second reference signal, and adds the second delay value to the first reference signal.

3. The method according to claim 2, wherein determining, by the first RRU, the first delay value according to the first reference signal comprises:
calculating, by the first RRU, a third delay value according to the first reference signal; and
calculating, by the first RRU, the first delay value according to the second delay value and the third delay value.

4. The method according to claim 3, wherein calculating, by the first RRU, the first delay value according to the second delay value and the third delay value comprises:
calculating the first delay value according to:
A=(B+C)/2, wherein:
A is the first delay value;
B is the second delay value; and
C is the third delay value.

5. The method according to claim 1, wherein after receiving, by the first RRU, the first reference signal from the second RRU, the method further comprises:
calculating, by the first RRU, an angle of direction according to the first reference signal; and
reporting, by the first RRU, the angle of direction to the upper-layer network element, so that the upper-layer network element performs location resolving processing according to the first delay value and the angle of direction to obtain the location information of the first RRU.

6. The method according to claim 1, wherein before receiving, by the first RRU, the first reference signal from the second RRU, the method further comprises:
receiving, by the first RRU, a frame offset instruction, wherein the frame offset instruction instructs an uplink window of the first RRU to correspond to a downlink window of the second RRU.

7. The method according to claim 1, wherein the first reference signal comprises a feature sequence signal, a primary synchronization signal (PSS), a secondary synchronization signal (SSS), a cell-specific reference signal (CRS), or a positioning pilot signal.

8. A method, comprising:
receiving, by a second remote radio unit (RRU), a second reference signal from a first RRU, wherein the first RRU is a to-be-positioned RRU, and the second RRU is located at a known location;
calculating, by the second RRU, a respective sequence detection strength for each of one or more cells and a second delay value according to the second reference signal; and
selecting, by the second RRU, a cell of the one or more cells in which the respective detection strength is greater than a threshold to send a first reference signal to the first RRU, wherein the first reference signal carries the second delay value, and a first delay value is determined according to the first reference signal.

9. The method according to claim 8, wherein after receiving, by the second RRU, the second reference signal from the first RRU, the method further comprises:
calculating, by the second RRU, an angle of direction according to the second reference signal.

10. The method according to claim 9, wherein before receiving, by the second RRU, the second reference signal from the first RRU, the method further comprises:
receiving, by the second RRU, a detection instruction from the first RRU or an upper-layer network element, wherein the detection instruction instructs the second RRU to prepare for signal detection.

11. The method according to claim 8, wherein before receiving, by the second RRU, the second reference signal from the first RRU, the method further comprises:
receiving, by the second RRU, a detection instruction from the first RRU or an upper-layer network element, and the detection instruction instructs the second RRU to prepare for signal detection.

12. A method, comprising:
receiving, by an upper-layer network element, a first delay value from a first remote radio unit (RRU), wherein the first RRU is a to-be-positioned RRU; and
performing, by the upper-layer network element, location resolving processing according to the first delay value, to obtain location information of the first RRU.

13. The method according to claim 12, wherein before performing, by the upper-layer network element, location resolving processing according to the first delay value, the method further comprises:
receiving, by the upper-layer network element, an angle of direction from the first RRU.

14. The method according to claim 13, wherein performing, by the upper-layer network element, location resolving processing according to the first delay value comprises:
performing, by the upper-layer network element, location resolving processing according to the first delay value and the angle of direction.

15. The method according to claim 12, wherein before receiving, by the upper-layer network element, the first delay value from the first RRU, the method further comprises:
sending, by the upper-layer network element, a frame offset instruction to the first RRU, wherein the frame offset instruction instructs an uplink window of the first RRU to correspond to a downlink window of a second RRU, and the second RRU is located at a known location.

* * * * *